US012010480B2

(12) United States Patent
Frey et al.

(10) Patent No.: US 12,010,480 B2
(45) Date of Patent: Jun. 11, 2024

(54) HEARING PROTECTION DEVICE

(71) Applicant: Sandra Maria Frey, Bern (CH)

(72) Inventors: Sandra Maria Frey, Bern (CH); Brigitte Maria Frey-Von Matt, Bolligen (CH)

(73) Assignee: Sandra Frey, Bern (CH)

( * ) Notice: Subject to any disclaimer, the term of this patent is extended or adjusted under 35 U.S.C. 154(b) by 216 days.

(21) Appl. No.: 17/425,549

(22) PCT Filed: Jan. 23, 2020

(86) PCT No.: PCT/EP2020/051595
§ 371 (c)(1),
(2) Date: Jul. 23, 2021

(87) PCT Pub. No.: WO2020/152255
PCT Pub. Date: Jul. 30, 2020

(65) Prior Publication Data

US 2022/0159368 A1 May 19, 2022

(30) Foreign Application Priority Data

Jan. 24, 2019 (CH) .................................... 00079/19
Apr. 18, 2019 (CH) .................................... 00530/19

(51) Int. Cl.
*H04R 1/10* (2006.01)
*G10K 11/00* (2006.01)
*H04R 31/00* (2006.01)

(52) U.S. Cl.
CPC ......... *H04R 1/1083* (2013.01); *G10K 11/002* (2013.01); *H04R 1/1016* (2013.01);
(Continued)

(58) Field of Classification Search
CPC .. H04R 1/1083; H04R 1/1016; H04R 1/1041; H04R 31/00; H04R 2430/01; H04R 3/00;
(Continued)

(56) References Cited

U.S. PATENT DOCUMENTS 7,039,195 B1 * 5/2006 Svean ..................... A61F 11/08 381/72
2011/0274284 A1 11/2011 Muelder et al.
2017/0245062 A1 * 8/2017 Jensen .................. H04R 19/04

FOREIGN PATENT DOCUMENTS

EP 1 246 503 A2 10/2002
EP 1322268 B1 * 1/2009 ........... H04R 1/1083
(Continued)

OTHER PUBLICATIONS

International Search Report dated Mar. 26, 2020 in corresponding International Patent Application No. PCT/EP2020/051595.
(Continued)

*Primary Examiner* — Akelaw Teshale
(74) *Attorney, Agent, or Firm* — MEDLER FERRO WOODHOUSE & MILLS PLLC

(57) ABSTRACT

The present invention relates to a hearing protection device comprising two sound insulation bodies (1), two microphones (2) and two loudspeakers (4). Each of the two sound insulation bodies (1) is configured to close an ear canal (100) of an ear of a user; each of the two microphones (2) is arranged at a distal side of one of the two sound insulation bodies (1); and each of the two loudspeakers (4) is arranged at a proximal side of one of the two sound insulation bodies (1). Each of the two sound insulation bodies (1) is equipped with one of the two microphones (2) and one of the two loudspeakers (4). The present invention also relates to a method of manufacturing a hearing protection device according to any one of the preceding claims, comprising the steps of: obtaining two sound insulation bodies (1) each
(Continued)

being configured to close an ear canal (100) of an ear of a user; equipping each of the two sound insulating bodies (1) at a distal side with a microphone (2); and equipping each of the two sound insulating bodies (1) at a proximal side with a loudspeaker (4).

14 Claims, 3 Drawing Sheets

(52) U.S. Cl.
CPC ........... *H04R 1/1041* (2013.01); *H04R 31/00* (2013.01); *H04R 2430/01* (2013.01)

(58) Field of Classification Search
CPC .. H04R 3/02; H04R 2460/01; H04R 2460/13; G10K 11/002
See application file for complete search history.

(56) References Cited

FOREIGN PATENT DOCUMENTS

| | | | | | |
|---|---|---|---|---|---|
| EP | 2 086 250 | A1 | | 8/2009 | |
| EP | 3 057 335 | A1 | | 8/2016 | |
| WO | 02/17839 | A1 | | 3/2002 | |
| WO | WO-0217835 | A1 | * | 3/2002 | .............. A61F 11/08 |
| WO | WO-0217836 | A1 | * | 3/2002 | .............. A61F 11/08 |
| WO | WO-0217837 | A1 | * | 3/2002 | .............. A61F 11/08 |
| WO | WO-0217839 | A1 | * | 3/2002 | ........... H04R 1/1083 |
| WO | WO-2009050306 | A2 | * | 4/2009 | .............. A61F 11/06 |
| WO | WO-2016115622 | A1 | * | 7/2016 | .............. A61F 11/08 |

OTHER PUBLICATIONS

Communication pursuant to Article 94(3) EPC dated Aug. 23, 2023 in EP Appl. No. 20 701 738.5.

* cited by examiner

HEARING PROTECTION DEVICE

TECHNICAL FIELD

The present invention relates to a hearing protection device and more particularly to a hearing protection device conceived for musicians, or for operators and generic individuals exposed to high sound pressure levels in the context of their profession or in their leisure time.

The present invention also relates to a method of manufacturing such as hearing protection device.

Such hearing protection device can be used for the protection of hearing especially of orchestra members who are positioned in the immediate vicinity of comparably loud musical instruments, or of operators exposed to very powerful sounds in general. Musical instruments of a symphony orchestra, of a Jazz orchestra or of a pop orchestra have a potential of being comparably or very loud in certain music passages.

BACKGROUND ART

Prolonged exposure to continuous, as well as to repeated, excessive sound level pressures, for instance during rehearsals or performances of symphonic orchestras or other kinds of bands, can cause the musicians themselves to eventually suffer from hearing damages or loss. For example, musicians positioned in front of loud instruments such as wind instruments in an orchestra are frequently exposed to comparably loud passages such that they may be affected by the respective high level of sound pressure.

The problem of hearing protection for musicians is particularly delicate, since during some passages a specific player should be protected from an acoustical overload emitted from surrounding colleagues, whereas in some different passages the same player may have to take part in a phrase of music to be played pianissimo and the attenuation, or dampening, desired in these different circumstances would be very restrained.

Panel-shaped sound shields are known which incorporate sound adsorbing materials. Panels, whether substantially straight or incorporating curved surfaces, are generally made of transparent acrylic or polycarbonate resins or similar materials and are applied to stands to be positioned in a protective configuration around the individual musician. However, such sound shields take up a considerable amount of work-space and force to modify the preferred or customary arrangement of instruments. Also, when bulky, they tend to create undesired sound reflections, whereas, when reduced in size and very enveloping, they annoyingly limit the freedom of movement of the musician for whose protection they have been placed. Also, they typically do not sufficiently protect the musicians, e.g., when considering the complete volume in an orchestra pit.

Conventionally, other passive means of sound attenuation are known, such as earplugs and earmuffs. These are typically generally provided with filtering inserts which achieve a compromise between protection during passages of high sound pressure level and hearability during softly played passages. Such passive means of sound attenuation are however not suitable to perform an ideally dynamic sound attenuation which should respond naturally the alternating sound pressure levels.

In particular, existing passive hearing protection devices are not suitable for a large portion of musicians. This typology of instruments and the human vocal apparatus entails, in fact, that players perceive the emitted sound not just via air-carried vibrations and/or sound waves, but also through a portion of vibrations conducted via a body of a musician. For example, stimulation of a bone or body conduction path can happen by mechanical stimulation over the body such as over the bones and/or via the air in the oral cavity.

Mechanical stimulation of the jawbone, for example, may result in a change in volume of an ear canal. As a consequence of, e.g., the jawbone being stimulated when playing the instruments—for instance via the mouthpiece of a played clarinet—the instrument player's ear canal volume will also be correspondingly modulated with the played sounds. Conventional passive earplugs or muffles are inserted in an ear canal. When an ear canal is thus closed, the sound level that is produced at the eardrum through the vibration of the jawbone increases by some dB compared to the sound transmitted via the air. Besides, the portion of sound, relative to the sound emitted by the own instrument played by an individual player, which follows the "parasitic" bone conduction path needs to only travel a very short way to the inner ear of the individual player. This bone-conducted portion of sound, or bone sound, is also substantially more strongly perceived by the individual player compared to the portion of airborne sound. The portion of sound emitted by a given instrument which is airborne ends up first reaching somehow attenuated the ear canal and subsequently the eardrum, when instead the bone-conducted portion of the same sound emitted by the given instrument has already reached the inner ear of the musician playing the given instrument. As a result, as soon as a passive earplug or muffle is introduced in an ear canal to achieve a sound pressure level attenuation of an airborne sound, the perception of a bone-conducted sound portion can become dominant.

In short, following an attenuation of the airborne sound via conventional passive earplugs, a shift happens in the perception of a musician wearing the earplugs, in the sense that the bone-conducted sound, or bone sound signal, emitted by his own instrument prevails, with resulting distortions.

Therefore, there is a need for a hearing protection device which allows to dynamically adjust the extent of sound pressure level attenuation according to the circumstances. Particularly, there is a need for a hearing protection device which achieves that a sufficient attenuation is guaranteed in connection with very loud passages in order to avoid masking effects; but also which achieves that no or proportionally little attenuation is applied during softly played passages, in order to ensure hear ability. There is concomitantly a need for a hearing protection device which is suitable for musicians, independently from the kind of instrument played. Moreover, there is a need for a hearing protection, which prevents any sound distortions from happening in the perception by a musician of the sound emitted by his own instrument.

DISCLOSURE OF THE INVENTION

According to the invention this need is settled by a hearing protection device and a method of manufacturing a hearing protection device as defined in the claims. Preferred embodiments are subject of the dependent claims.

In particular, the invention deals with a hearing protection device comprising two sound insulation bodies, two microphones and two loudspeakers, wherein each of the two sound insulation bodies is configured to close an ear canal of an ear of a user.

Each of the two microphones is arranged at a distal side of one of the two sound insulation bodies, and each of the two loudspeakers is arranged at a proximal side of one of the two sound insulation bodies, such that each of the two sound insulation bodies is equipped with one of the two microphones and one of the two loudspeakers.

The term "hearing protection device" as used herein can relate to an apparatus which protects the ear from being damaged and/or which reduces the dominating effect of some sources for the perception of an aural impression. In addition to the protection in the specific sense, the hearing protection device can also embody other functions such as, e.g., amplification of comparably soft sound as described in more detail below.

The term "microphone" as used herein relates to a transducer that converts sound or an acoustic signal into an electrical and/or digital signal. Accordingly, the term "loudspeaker" relates to a transducer that converts an electrical and/or digital signal into sound or an acoustic signal.

The term "distal side" in connection with the sound insulation bodies relates to a side opposite to or turned away from the inner ear (auris interna). This side typically is oriented away from the ear canal (external acoustic meatus) or the eardrum (tympanic membrane). Analogously, the term "proximal side" relates to a side towards the inner ear. This side typically is oriented to the ear canal or the eardrum.

The term "close" in connection with the sound insulation bodies can relate to covering or plugging of the ear canal. Thereby, the ear canal can be sealed or tightened. The term "sealed" in this connection can relate to a soundproof or essentially soundproof closing. In particular, the ear canal can be tightly closed, such that essentially no sound can pass through or into the ear canal unhindered or undamped.

The sound insulation bodies can take the form of a standardized, pre-molded sleeve designed to comply and conform to an ear canal once press-fitted. Or, they can be a custom-made shell which is individually conceived to ideally adapt to a given ear canal shape. The sound insulation bodies can also take the form of acoustic seals surrounding the active part of the hearing protection device and be designed for retaining the hearing protection device within the ear canal. The structure of the acoustic seals itself can serve to prevent feedback by acoustically decoupling the microphones and the respective loudspeakers.

By having the microphones and loudspeakers at the sound insulation bodies, the hearing protection device according to the invention can be sophisticatedly arranged to specific needs in a particular application. Like this, the extent of sound pressure level attenuation can dynamically be adjusted according to the given circumstances. Particularly, thereby it can be achieved that a sufficient attenuation is guaranteed in connection with very loud passages in order to avoid masking effects and also that a corresponding amplification is applied during softly played passages.

In one embodiment, the sound insulation bodies are over ear structures, or commonly designated BTE (behind the ear) structures. In such embodiment, the respective sound insulation body encompasses or surrounds the complete associated outer ear (auris externa), in most cases including the pinna. It typically, tightly fits to the head of the user. Such insulation bodies can be embodied and manufactured in a comparably simple fashion, since they have less to be adapted to the individual situation of a specific user. Thus, a comparably generic design can be appropriate for the intended users.

However, such over ear sound insulation bodies can also be disadvantageous since they may affect the function of the pinna. This can particularly be undesired in situations where precise and graded hearing is important such as for musicians in orchestras or the like. Further, such over ear structures may comparably easily be displaced, which deteriorates the proper operation of the hearing protection device. Also, such comparably bulky over ear structures can be undesired for aesthetic reasons.

In a preferred embodiment, the sound insulation bodies are plug-shaped such that they are arrangeable in the ear canal of the ear of the user, thereby closing the ear canal. The sound insulation bodies can take the form of a standardized, pre-molded sleeve designed to comply and conform to an ear canal once press-fitted. The sound insulation bodies may be made of a soft and resilient material, for instance foam-like material, in order to improve insertion by compression in the ear canal.

The term "plug" can relate to a quasi cylindrical or conical shape. In particular, the sound insulation bodies in such embodiments are shaped in compliance with the pipe-like anatomy of the ear canal.

Preferably, the hearing protection device comprises a controller coupled to the two microphones and the two loudspeakers. The controller can be an electronic processing element, connected to respective microphones and loudspeakers, for the processing and manipulation of electronic signals. This electronic processing element may comprise analogue or digital signal processing devices. Controller, microphones and loudspeakers can be arranged within the sound insulation bodies.

In a configuration comprising the controller, the microphone, acting as an electroacoustic transducer, receives acoustic signals, converts such signals into electrical signals and transmits them to the controller.

The controller can be part of a signal processing circuit which performs various signal processing functions. Such signal processing functions can include amplification, background noise reduction, beam forming, feedback cancelling, frequency lowering, signal processing in frequency and time domain, sound type classification, tone control, and others.

In a configuration comprising the controller, the loudspeaker, acting as an electroacoustic transducer, converts the electrical signal from the controller in the signal processing circuit into an acoustic signal which is transmitted as audio into a user's ear, directed to a user's eardrum.

The controller can be a structure integrated into the sound insulation bodies. Or it can be a separate unit, which is physically distinct from the sound insulation bodies. In such embodiments the controller can be wired and/or wireless coupled to the microphones and loudspeakers. Further, it is possible that the controller is embodied as a distributed structure in which some components are located in and/or at the sound insulation bodies and/or others are in a separate unit.

Preferably, the controller is configured to replay acoustic input signals captured by the respective microphone at an input volume in the form of acoustic output signals at an output volume via the respective loudspeaker. Such configuration allows for selectively controlling the of sound transferred to the eardrum.

Preferably, the controller is configured to adjust the output volume of the acoustic output signals to be lower than the input volume of the acoustic input signals, when the input volume exceeds a predefined upper threshold. The upper threshold can be a sound pressure level value. It can be fixed in the device. Or, it can be adjustable by a user, e.g. via the controller. Thus, a suitable attenuation of the sound pressure level is achieved in especially loud passages, in a way that, e.g. the musician wearing the hearing protection device does not resent from any masking effect.

Preferably, the controller is configured to increasingly reduce the output volume of the acoustic output signals compared to the input volume of the acoustic input signals, the more the input volume exceeds the predefined upper threshold. This progressive attenuation can prove to be very useful for instance in a crescendo passage, where an energetic and prompt reaction to smoothly adjust to an acceptable sound pressure level for the musician's eardrum is preferable.

Preferably, the controller is configured to adjust the output volume of the acoustic output signals at essentially the same level as the input volume of the acoustic input signals, when the input volume deceeds the predefined upper threshold. This can be useful in passages wherein the orchestra plays altogether to a sound pressure level compatible with a good intelligibility by the musician wearing the hearing protection device of both the surrounding music scenery and of the sound emitted by his own instrument.

Further, the controller is preferably configured to adjust the output volume of the acoustic output signals to be higher than the input volume of the acoustic input signals, when the input volume deceeds a predefined lower threshold. The lower threshold can be a sound pressure level value. It can be fixed in the device. Or, it can be adjustable by a user, e.g. via the controller. This may be advantageous for instance in passages where the orchestra members play to a pianissimo direction.

Preferably, the controller is configured to filter the acoustic output signals when the input volume deceeds the predefined lower threshold. The filtering can relate to an amplitude, a frequency and/or a time of the acoustic output signals. Like this, it is possible to provide a pre-filtered control signal, adjusted to the needs of a user such as a musician. It can also be ensured that the musician obtains a sound rendition optimal for performing and/or accompanying the rest of the orchestra.

Preferably, the hearing protection device according to the present invention comprises a body sound sensor. The controller can therefore be configured to adapt the acoustic output signals based on body sound signals sensed by the body sound sensor.

The term "body sound" as used herein relates to sound transferred via a body of a person to an ear of the person. The components of the body via which the sound may be transferred comprise bones, other tissue, bodily fluids or gases in bodily cavities. For example, the body sound can be or comprise sound transferred via a bone structure such as the jaw and/or the skull into the ear of the person. It may also include combinations of plural components of the body such as a transfer via bone tissue and bodily fluid as, e.g., blood. Thus, the body sound may comprise any sound or sound-like phenomena inducing a hearing impression in the ear of the person, other than sound transferred to the ear via air through the ear canal.

A path the body sound passes when being transferred to the ear is referred herein as "body path". In particular, the body path can be a route along the body components which transfer sound to the ear. For example, in connection with a musician playing a violin, the body path may be a route from the jaw contacting the violin, via the oral cavity and the skull to the ear.

Thanks to such a body sound sensor, the sound pressure level of the acoustic output signals emitted by the loudspeakers can be adjusted in a way that no disturbing effect derives from a combination of body-conducted and airborne sound. The body sound sensor can ensure, in cooperation with the controller, that an optimal proportion between body-conducted and airborne sound is rendered to the ears of a musician, particularly when the musician is playing his own instrument.

The body sound sensor can be kept external to the sound insulation body and transmit to the controller either via cable and/or wireless. Advantageously, the body sound sensor comprises securing means for attachment to a musical instrument and transmits data about the detected body-conducted sound wireless, so that unrestricted movement of the musician playing the musical instrument and/or of the musical instrument is allowed.

The body sound sensor can take the form of an accelerometer, delivering a signal that is corresponding, for instance proportional, to the body sound signal portion. Alternatively, it can be a pressure sensor, an optical sensor, a vibration sensor, an acoustic sensor or the like. The hearing protection device can also comprise plural sensors in order to achieve a more accurate sensing result. Or the body sensor itself may include plural sensor units based on the same or different measuring techniques.

In the context of the present invention, the bone-conducted sound can also be designated as body sound; likewise the body-conducted sound signal can be designated as body sound signal. On the other hand, the airborne sound can also be intended as the part, normally prevailing, of acoustic signal transmitted through waves in air making up the acoustic output signal.

Preferably, the adaptation of the acoustic output signals comprises correcting interferences between a body sound signal and the acoustic output signal.

One option of the cooperation between body sound sensor and the controller can envisage to configure the controller to estimate a body path portion based on the body sound signals and to deduct the estimated body path portion from the acoustic output signals. The deduction, or subtraction, of the disturbing body path portion from the microphone can happen in time domain. The estimation by the control can happen, or be embodied, as a path impulse response. Subtraction of the body path portion is especially advantageous when the portion to subtract is in a range of lower frequencies.

Alternatively, the controller can be configured to estimate a body path portion based on the body sound signals and to generate the acoustic output signals in completion of the estimated body path portion. According to such additive mode, the sound signal component due to the body sound, for instance obtained by the body sound sensor, can be appropriately processed and added by mixing to the acoustic output signals. This mode can help the musician to have a natural perception of his own instrument as he plays it.

Processing modes which combine, in several proportions, the subtractive and the additive modes above described can also be envisaged, stressing the accent on different needs.

Preferably, the hearing protection device according to the preset invention comprises a feedback suppressor acting against a feedback between the microphones and the loudspeakers. This is especially desirable given that the space in an ear canal is rather tight and microphones and loudspeakers can adversely interact if perfect sound tightness between the regions where they are placed is not achieved.

The feedback suppressor can comprise an electronic component such as a signal processor which suppresses or at least reduces the feedback. Also, the feedback suppressor can be part of the controller or embodied by the controller.

Preferably, the hearing protection device comprises two correction microphones, wherein each of the two correction microphones is arranged at a proximal side of one of the two sound insulation bodies. Like this, the sides of the sound insulation bodies provided with the loudspeakers are additionally equipped with the correction microphones. Such correction microphones allow for detecting and correcting inappropriate sound at the eardrum which can affect the hearing experience of the user of the hearing protection device.

Thereby, the controller preferably is configured to evaluate a correction signal provided by the correction microphones and to generate the acoustic output signals corrected in accordance with the evaluated correction signal. For allowing an efficient correction of the acoustic output signals, the correction microphones are to be positioned as close to the eardrum as possible. When the bodies are plug-shaped, this is the inner ear side of the plugs. The correction of the acoustic output signals may include filtering for considering sound bypassing the sound insulation bodies. Also, it can include compensation of body path sound arriving at the eardrum via paths other than via the air. Advantageously, the controller is configured to initialize the hearing protection device by adjusting the generation of the acoustic output signal, e.g. by adapting respective filters or the like. Such initialization allows for eliminating disturbances in the hearing experience. For example, such disturbances may be caused by the specific anatomic conditions of the user or by inappropriate setting or placing of the sound insulation bodies.

The present invention also relates to a method of manufacturing a hearing protection device as above described. The manufacturing method comprises the steps of obtaining two sound insulation bodies each being configured to close an ear canal of an ear of a user; equipping each of the two sound insulating bodies at a distal side with a microphone; and equipping each of the two sound insulating bodies at a proximal side with a loudspeaker.

Preferably, the manufacturing method according to the present invention further comprises the steps of providing the hearing protection device with a controller; coupling the microphones and the loudspeakers to the controller; and configuring the controller to implement any of the several functions described above.

Preferably, the manufacturing method according to the present invention also comprises the step of providing the hearing protection device with a body sound sensor cooperating with the controller in order to adapt the acoustic output signals based on body sound signals sensed by the body sound sensor.

Preferably, the manufacturing method also comprises the step of providing the body sound sensor with securing means configured to retain the body sound sensor to a music instrument.

The body sound sensor can be connected to related components in a wired manner such as by cables or the like. However, it preferably is equipped with a wireless transmitter, e.g. a radio-frequency transmitter such as a short-range device, and the controller, or part of the hearing protection device which is in communication with the controller, is equipped with a corresponding wireless receiver, so that no cables are needed to provide the controller of the hearing protection device with information collected by the body sound sensor. This helps to make the movements of the musician and/or of the musical instrument to which the body sound sensor is applied more natural and less restricted.

Alternatively, the controller can be kept external to the sound insulation body and therefore to the ear canal, supported for instance by some retaining means to the pinna, e.g. behind the ear. In case the individual ear canal is especially small, for instance, the controller can be outside and be connected to microphones and loudspeakers either via cables or wirelessly.

Preferably, the manufacturing method comprises configuring the controller to evaluate a correction signal provided by the correction microphones and to generate the acoustic output signals corrected in accordance with the evaluated correction signal.

BRIEF DESCRIPTION OF THE DRAWINGS

The hearing protection device according to the invention is described in more detail below by way of exemplary embodiments and with reference to the attached drawings, in which.

DESCRIPTION OF EMBODIMENTS

In the following description certain terms are used for reasons of convenience and are not intended to limit the invention. The terms "right", "left", "up", "down", "under" and "above" refer to directions in the figures. The terminology comprises the explicitly mentioned terms as well as their derivations and terms with a similar meaning. Also, spatially relative terms, such as "beneath", "below", "lower", "above", "upper", "proximal", "distal", and the like, may be used to describe one element's or feature's relationship to another element or feature as illustrated in the figures. These spatially relative terms are intended to encompass different positions and orientations of the devices in use or operation in addition to the position and orientation shown in the figures. For example, if a device in the figures is turned over, elements described as "below" or "beneath" other elements or features would then be "above" or "over" the other elements or features. Thus, the exemplary term "below" can encompass both positions and orientations of above and below. The devices may be otherwise oriented (rotated 90 degrees or at other orientations), and the spatially relative descriptors used herein interpreted accordingly. Likewise, descriptions of movement along and around various axes include various special device positions and orientations.

To avoid repetition in the figures and the descriptions of the various aspects and illustrative embodiments, it should be understood that many features are common to many aspects and embodiments. Omission of an aspect from a description or figure does not imply that the aspect is missing from embodiments that incorporate that aspect. Instead, the aspect may have been omitted for clarity and to avoid prolix description. In this context, the following applies to the rest of this description. If, in order to clarify the drawings, a figure contains reference signs which are not explained in the directly associated part of the description, then it is referred to previous or following description sections. Further, for reason of lucidity, if in a drawing not all features of a part are provided with reference signs it is referred to other drawings showing the same part. Like numbers in two or more figures represent the same or similar elements.

Figure 1A:
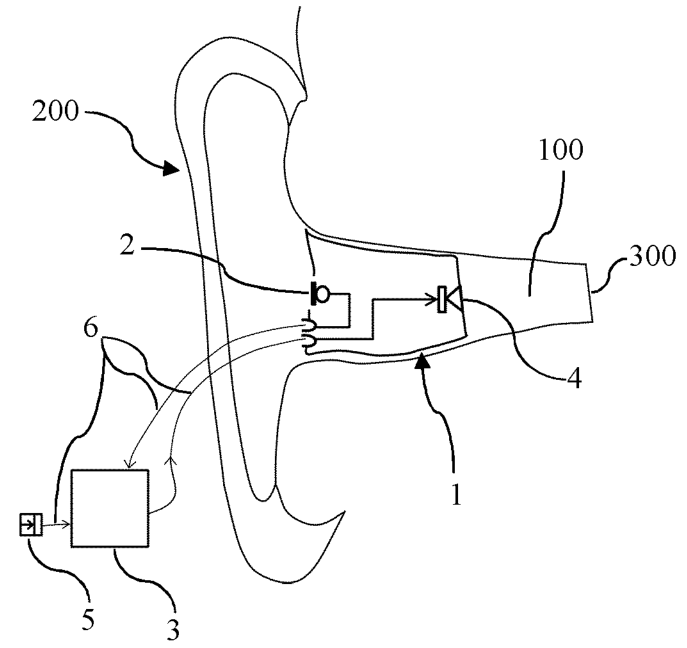
FIG. 1A shows a first embodiment of a hearing protection device according to the present invention, wherein some electric circuitry comprising a controller and a sensor are positioned external to a user's ear canal.

With reference to FIG. 1A, a first embodiment of a hearing protection device according to the present invention is shown. A plug-shaped sound insulation body 1 is configured to fit in and close an ear canal 100 of an ear of a user. The pinna 200 of the user's ear is kept unaffected by the sound insulation body 1. The sound insulation body 1 is configured to be inserted in the ear canal 100 at a suitable depth thereof, so that its proximal side is at a predefined distance from the user's eardrum 300. A microphone 2 is arranged at a distal side of the sound insulation body 1, substantially at the opening of the ear canal 100. A loudspeaker 4 is arranged at a proximal side of the sound insulation body 1. A controller 3 is coupled to the microphone 2 and to the loudspeaker 4.

The microphone 2, acting as an electroacoustic transducer, receives acoustic signals, converts such signals into electrical signals and transmits them to the controller 3. The loudspeaker 4, acting as an electroacoustic transducer, converts the electrical signal from the controller 3 into an acoustic signal which is transmitted as audio into a user's ear, directed to a user's eardrum 300. The controller 3 is particularly configured to replay acoustic input signals captured by the microphone 2 at an input volume in the form of acoustic output signals at an output volume via the loudspeaker 4. The rules and parameters of adjustment of the output volume with respect to the input volume are therefore applied by the electric circuitry incorporated in the controller 3.

In the embodiment of hearing protection device of FIG. 1A, the controller 3 is positioned external to a user's ear canal 100. This configuration can for instance be applied in case the ear canal is particularly narrow or in case a strict standardization in manufacturing the hearing protection device is desired, so that the dimensioning of the sound insulation body 1 can be kept substantially independent from the controller 3. The connecting cables 6 between connector 3 and respectively microphone 2 and loudspeaker 4 are an optional design and can be substituted with a wireless transmission system.

In the embodiment of FIG. 1A, a bone sound sensor 5 as body sound sensor cooperates with the controller 3 to which it is connected in a way that the controller 3 adapts the acoustic output signals based on bone sound signals sensed by the bone sound sensor 5. As mentioned, the bone sound sensor 5 can be in wireless communication with the controller, e.g. via a short-range radio communication.

Figure 1B:
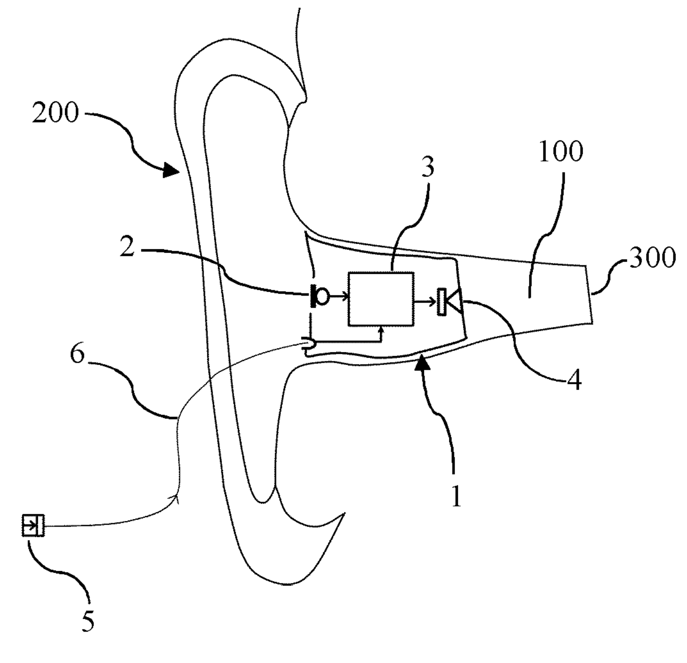
FIG. 1B shows a second embodiment of a hearing protection device according to the present invention, fully integrated inside a user's ear canal.

In a second embodiment of the hearing protection device according to the present invention as shown in FIG. 1B, the electronic circuitry is integrated inside a user's ear canal 100, the controller being positioned within the sound insulation body 1. The bone sound sensor 5, however, is still kept external to the user's ear, to better detect the bone-conducted component of sound signal which emanates from instrument parts like a mouth piece or a chinrest. The bone sound sensor 5 can be connected to the controller 3 via cables 6.

Figure 2:
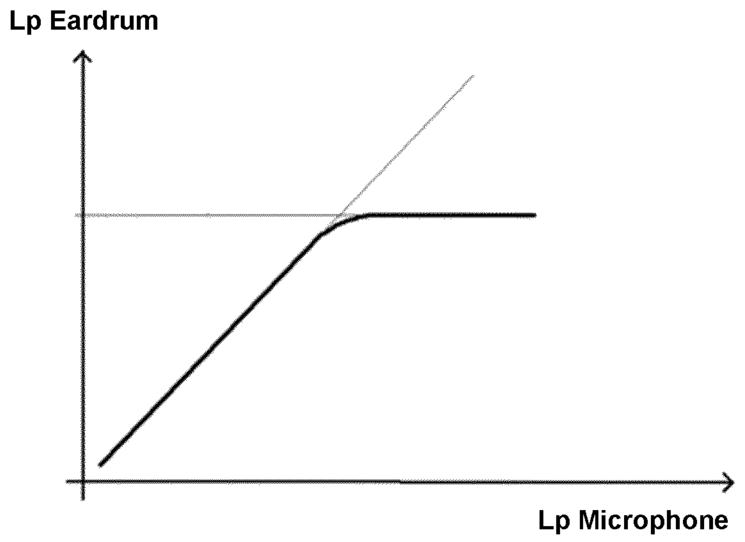
FIG. 2 shows an exemplary diagram of amplitude values of sound pressure levels, Lp, perceived at the eardrum in function of the values of sound pressure levels captured at a microphone, showing how the hearing protection device according to the present invention implements a limitation of the maximum possible loudness, or maximum possible sound pressure level, that can reach the eardrum.

FIG. 2 shows an exemplary diagram of the amplitude values of sound pressure level, Lp, perceived at the eardrum 300 in function of the values of sound pressure level captured at the microphone 2 of a hearing protection device according to the present invention. It is shown how the hearing protection device according to the present invention implements a limitation of the maximum possible loudness, or maximum possible sound pressure level, that can reach the eardrum 300. The adjustment carried out by the hearing protection device is such that in loud passages of music, the acoustic output signals are emitted by the loudspeaker 4 only relatively little amplified, while the amplification increases proportionally during soft passages of music. In combination with the passive basic attenuation provided by the material of sound insulation body 1, the maximum sound pressure level reaching the eardrum 300 of a user is effectively limited.

Figure 3:
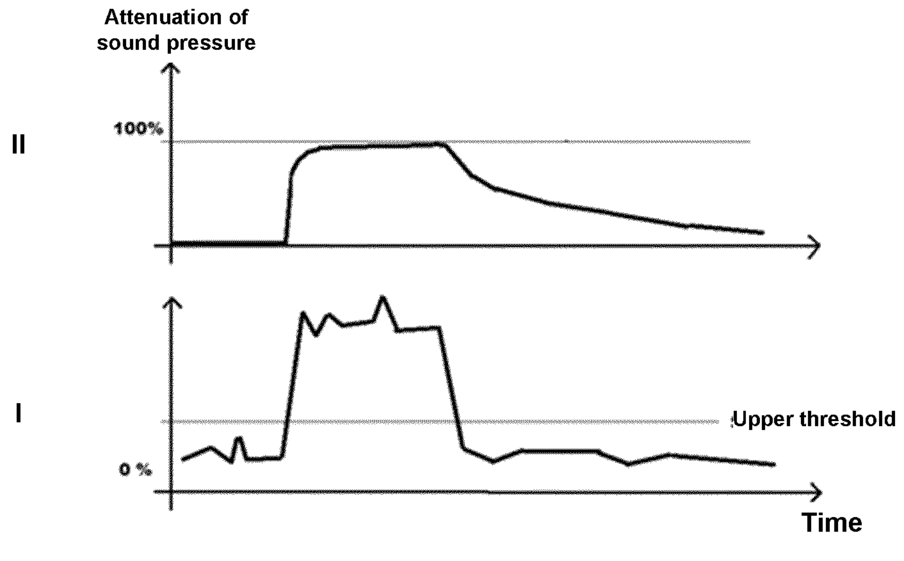
FIG. 3 shows a first exemplary diagram representing the behaviour of the sound pressure level, in function of time, of an entering sound signal captured by the microphone of the hearing protection device according to the present invention; and a second exemplary diagram illustrating an adjustment applied to an output volume of the acoustic output signals by the hearing protection device according to the present invention.

FIG. 3 shows a first exemplary diagram I representative of the behaviour of the sound pressure level, in function of time, of an entering sound signal captured by the microphone 2 of the hearing protection device according to the present invention; and a second diagram II illustrating an adjustment applied to an output volume of the acoustic output signals by the controller 3 of the hearing protection device according to the present invention, in function of time. The time juxtaposition of diagrams I and II allows to appreciate how, as soon as an acoustic input signal with a sound pressure level which is too high reaches the microphone 2, the controller 3 of the hearing protection device reacts relatively fast by applying an adjustment of the sound pressure level, so that an acoustic output signal is emitted by the loudspeaker 4 which is more compatible with the user's needs and safety. The adjustment operates as long as the input sound pressure level, or input volume, of the entering captured input sound signal remains over a predefined upper threshold. When the input volume decreases, a smoother, less abrupt and more time-diluted reaction to the diminishing sound pressure level of the controller 3 achieves that, while the user keeps a good awareness of the surrounding sound, he also does not experience an unpleasant perception of an intervening adjustment and of an external system acting on the sound, avoiding any artificial sounding effect.

Figure 4:
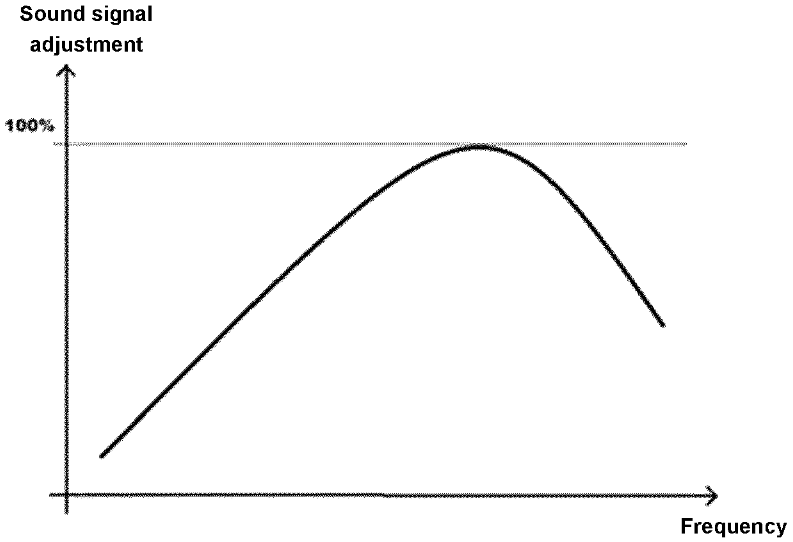
FIG. 4 shows an exemplary diagram of a filtered sound signal picked at a microphone of the hearing protection device according to the present invention, in function of frequency.

FIG. 4 shows an exemplary diagram of a filtered sound signal picked at a microphone 2 of the hearing protection device according to the present invention, in function of frequencies. In particular, it shows a behaviour of an adjustment applied by the controller 3 to an output volume of the acoustic output signals by the hearing protection device in function of frequencies. The adjustment expressly is implemented and programmed to kick in when the sound pressure level, or input volume, is too high particularly at higher frequencies which, compared to lower frequencies, are especially harmful or disturbing for a user's hearing.

Figure 5:
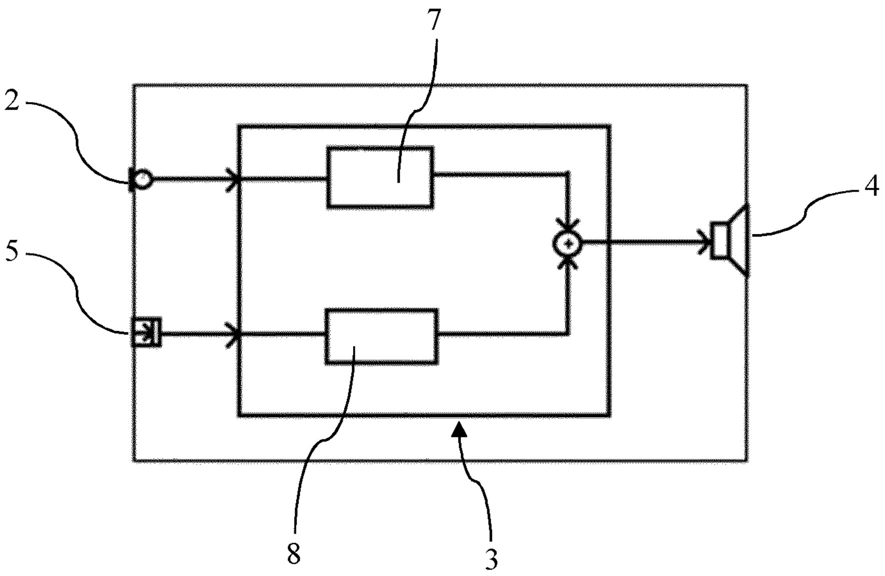
FIG. 5 shows a scheme of an exemplary embodiment of the hearing protection device according to the present invention, when it is taken into account a sound signal portion coming from the musical instrument which is played itself by a musician.

In the schematic representation of FIG. 5, an exemplary embodiment of the hearing protection device according to the present invention comprises a bone sound sensor 5 as body sound sensor. The signal processing electric circuitry, essentially in the controller 3, takes into account a sound signal portion coming from the musical instrument which is itself played by a musician, as detected by the bone sound sensor 5. The bone-conducted sound signal portion, originating from the musical instrument played by the musician, is then processed by dedicated processing means 8 of the controller 3, similarly to the airborne acoustic input signals captured by the microphone 2 which are processed by dedicated processing means 7 of the controller 3. The processed bone-conducted sound signal portion and the processed acoustic input signals are then mixed together in a programmed way. The resulting mixed signal is transmitted to the loudspeaker 4. In the embodiment of FIG. 5, the controller 3 is configured to estimate a bone path portion based on the bone sound signals and to generate the acoustic output signals in completion of the estimated bone path portion. The musician is thus offered a very natural perception of the surrounding musical environment and of his own contribution to such musical environment.

This description and the accompanying drawings that illustrate aspects and embodiments of the present invention should not be taken as limiting the claims defining the protected invention. In other words, while the invention has been illustrated and described in detail in the drawings and foregoing description, such illustration and description are to be considered illustrative or exemplary and not restrictive. Various mechanical, compositional, structural, electrical, and operational changes may be made without departing from the spirit and scope of this description and the claims. In some instances, well-known circuits, structures and techniques have not been shown in detail in order not to obscure the invention. Thus, it will be understood that changes and modifications may be made by those of ordinary skill within the scope and spirit of the following claims. In particular, the present invention covers further embodiments with any combination of features from different embodiments described above and below. Additionally, even though in the present disclosure the exemplary embodiments are mainly discussed in connection with musicians, it is understood that the same technique can also be beneficial in other applications. In particular, in any situations where a sophisticated sound reduction at some sound pressure levels and simultaneously an amplification at some other sound pressure levels is required, the sound protection device according to the invention can be particularly beneficial. For example, the sound protection device can also be useful in airplanes where the sound of the aircraft is disturbing but talking should be possible. Or, it can be helpful in kindergartens or similar institutions, in which it is intended to understand speaking of children but also to reduce the level or volume of screaming.

The disclosure also covers all further features shown in the Figs. individually although they may not have been described in the afore or following description. Also, single alternatives of the embodiments described in the figures and the description and single alternatives of features thereof can be disclaimed from the subject matter of the invention or from disclosed subject matter. The disclosure comprises subject matter consisting of the features defined in the claims or the exemplary embodiments as well as subject matter comprising said features.

Furthermore, in the claims the word "comprising" does not exclude other elements or steps, and the indefinite article "a" or "an" does not exclude a plurality. A single unit or step may fulfil the functions of several features recited in the claims. The mere fact that certain measures are recited in mutually different dependent claims does not indicate that a combination of these measures cannot be used to advantage. The terms "essentially", "about", "approximately" and the like in connection with an attribute or a value particularly also define exactly the attribute or exactly the value, respectively. The term "about" in the context of a given numerate value or range refers to a value or range that is, e.g., within 20%, within 10%, within 5%, or within 2% of the given value or range. Components described as coupled or connected may be electrically or mechanically directly coupled, or they may be indirectly coupled via one or more intermediate components. Any reference signs in the claims should not be construed as limiting the scope.

The invention claimed is:

1. A hearing protection device comprising:
two sound insulation bodies;
two microphones;
two loudspeakers;
a body sound sensor; and
a controller coupled to the two microphones and the two loudspeakers,
wherein
each of the two sound insulation bodies is configured to close an ear canal of an ear of a user,
each of the two microphones is arranged at a distal side of one of the two sound insulation bodies, and
each of the two loudspeakers is arranged at a proximal side of one of the two sound insulation bodies,
such that each of the two sound insulation bodies is equipped with one of the two microphones and one of the two loudspeakers,
wherein the controller is configured to replay acoustic input signals captured by the two microphones at an input volume in the form of acoustic output signals at an output volume via the two loudspeakers,
wherein the controller is configured to adapt the acoustic output signals based on body sound signals sensed by the body sound sensor, and
wherein adapting the acoustic output signals comprises correcting interferences between the body sound signals and the acoustic output signals.

2. The hearing protection device of claim 1, wherein the sound insulation bodies are plug-shaped such that they are arrangeable in the ear canal of the ear of the user, thereby closing the ear canal.

3. The hearing protection device of claim 2, wherein the controller is configured to adjust the output volume of the acoustic output signals to be lower than the input volume of the acoustic input signals when the input volume exceeds a predefined upper threshold.

4. The hearing protection device of claim 1, wherein the controller is configured to adjust the output volume of the acoustic output signals to be lower than the input volume of the acoustic input signals when the input volume exceeds a predefined upper threshold.

5. The hearing protection device of claim 1, wherein the controller is configured to increasingly reduce the output volume of the acoustic output signals compared to the input volume of the acoustic input signals the more the input volume exceeds a predefined upper threshold.

6. The hearing protection device of claim 1, wherein the controller is configured to adjust the output volume of the acoustic output signals at essentially the same level as the input volume of the acoustic input signals, when the input volume is below a predefined upper threshold.

7. The hearing protection device of claim 1, wherein the controller is configured to adjust the output volume of the acoustic output signals to be higher than the input volume of the acoustic input signals when the input volume is below a predefined lower threshold.

8. The hearing protection device of claim 7, wherein the controller is configured to filter the acoustic output signals when the input volume is below the predefined lower threshold.

9. The hearing protection device of claim 1, wherein the controller is configured to estimate a body path portion based on the body sound signals and to deduct the estimated body path portion from the acoustic output signals.

10. The hearing protection device of claim 1, wherein the controller is configured to estimate a body path portion based on the body sound signals and to generate the acoustic output signals in completion of the estimated body path portion.

11. The hearing protection device of claim 1, comprising a feedback suppressor acting against a feedback between the microphones and the loudspeakers.

12. The hearing protection device of claim 1, comprising two correction microphones, wherein each of the two correction microphones is arranged at a proximal side of one of the two sound insulation bodies.

13. The hearing protection device of claim 1, comprising two correction microphones, wherein each of the two correction microphones is arranged at a proximal side of one of the two sound insulation bodies, wherein the controller is configured to evaluate a correction signal provided by the correction microphones and to generate the acoustic output signals corrected in accordance with the evaluated correction signal.

14. A method of manufacturing a hearing protection device according to claim 1, comprising the steps of:

obtaining two sound insulation bodies each being configured to close an ear canal of an ear of a user;

equipping each of the two sound insulating bodies at a distal side with a microphone; and equipping each of the two sound insulating bodies at a proximal side with a loudspeaker;

providing the hearing protection device with a controller;

coupling the microphones and the loudspeakers to the controller;

configuring the controller to replay acoustic input signals captured by the microphones at an input volume in the form of acoustic output signals at an output volume via the loudspeakers; and coupling a body sound sensor to the controller wherein the controller is configured to adapt the acoustic output signals based on body sound signals sensed by the body sound sensor and wherein adapting the acoustic output signals comprises correcting interferences between the body sound signals and the acoustic output signals.

* * * * *